United States Patent
Lionetti

[11] Patent Number: 5,671,609
[45] Date of Patent: Sep. 30, 1997

[54] REFRIGERATION STORAGE TRAILER

[76] Inventor: Nicola Lionetti, 759 S. Mayfair, Daly City, Calif. 94015

[21] Appl. No.: 700,733

[22] Filed: Aug. 15, 1996

[51] Int. Cl.⁶ ..................................................... F25D 17/04
[52] U.S. Cl. ............................... 62/407; 62/239; 454/118
[58] Field of Search .............................. 62/404, 407, 408, 62/239, 263, 440, 447; 426/419, 312, 319, 321; 454/91, 90, 118

[56] References Cited

U.S. PATENT DOCUMENTS

| | | |
|---|---|---|
| 2,524,664 | 10/1950 | Henderson et al. . |
| 3,620,765 | 11/1971 | McDonnell . |
| 4,474,020 | 10/1984 | Freeman . |
| 4,532,774 | 8/1985 | Burns . |
| 4,598,555 | 7/1986 | Windecker . |
| 4,934,255 | 6/1990 | McDonnell . |
| 4,979,431 | 12/1990 | Fujimoto et al. ............... 62/239 |
| 5,028,443 | 7/1991 | Wade . |
| 5,319,941 | 6/1994 | Schilling ............................ 62/239 |
| 5,460,841 | 10/1995 | Herdeman . |

*Primary Examiner*—John M. Sollecito
*Attorney, Agent, or Firm*—Douglas E. White; Acronational Law Firm

[57] ABSTRACT

A method is taught herein of providing a controlled environment for the storage of produce within a portable, standard insulated trailer cabin, wherein the following objectives are accomplished: initiated ripening; ripening; cooling and heat removal; temperature stabilization; and the loading and unloading of palletized fruit on skid-mounted rollers. The invention accomplishes within a portable elongated cabin that which heretofore has only been accomplished in refrigeration rooms built within a fixed building. Ceiling-mounted air cooling units are uniformly distributed throughout the trailer along the long edge of the palletized fruit, thus allowing the cooled and/or treated air to be drawn across the fruit pallets directly and evenly and through as short a path as practical. An air suction chamber is built into the forward part of the trailer, opposite the loading door. Suction fans are built into a thin sheet-metal wall forming this chamber. A plastic membrane roll may be drawn over the top and down one end of a pallet row. It is supported on the suction side of the row against the trailer wall by rest rails. A continuous track of floor-mounted traction steel pipe rollers is provided upon which pallets of fruit may be loaded with a fork lift and then moved forward in the trailer manually.

12 Claims, 3 Drawing Sheets

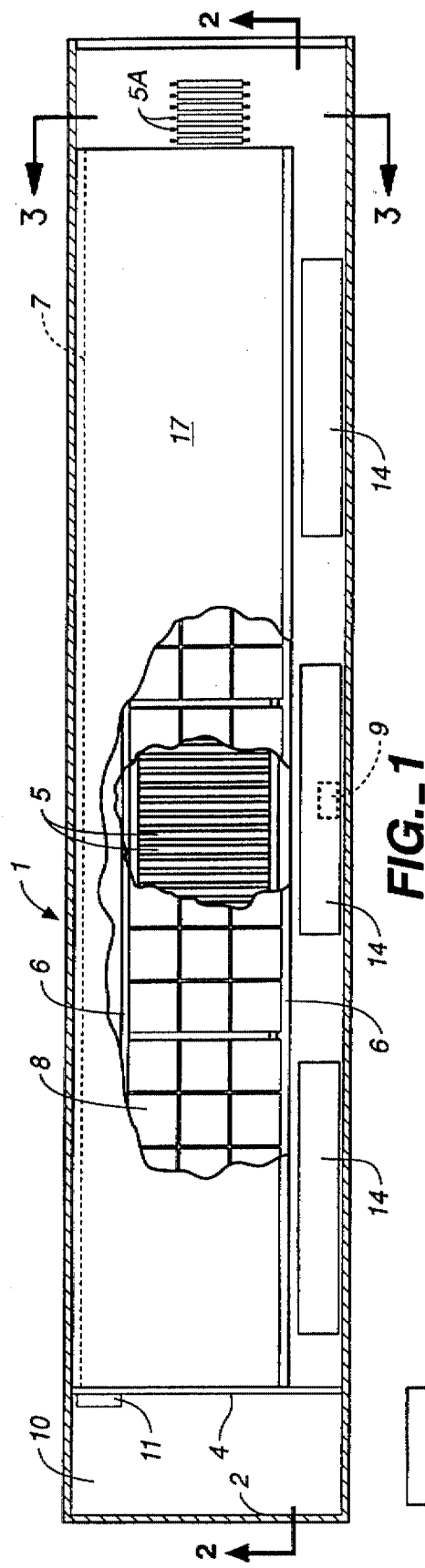
FIG._1
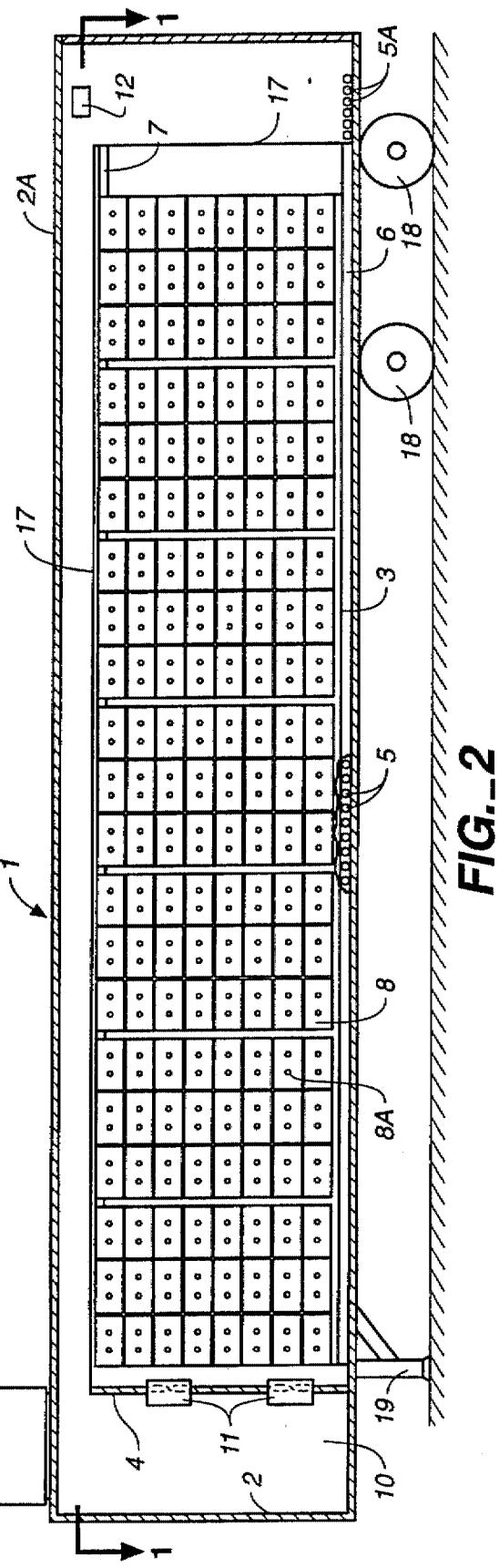
FIG._2

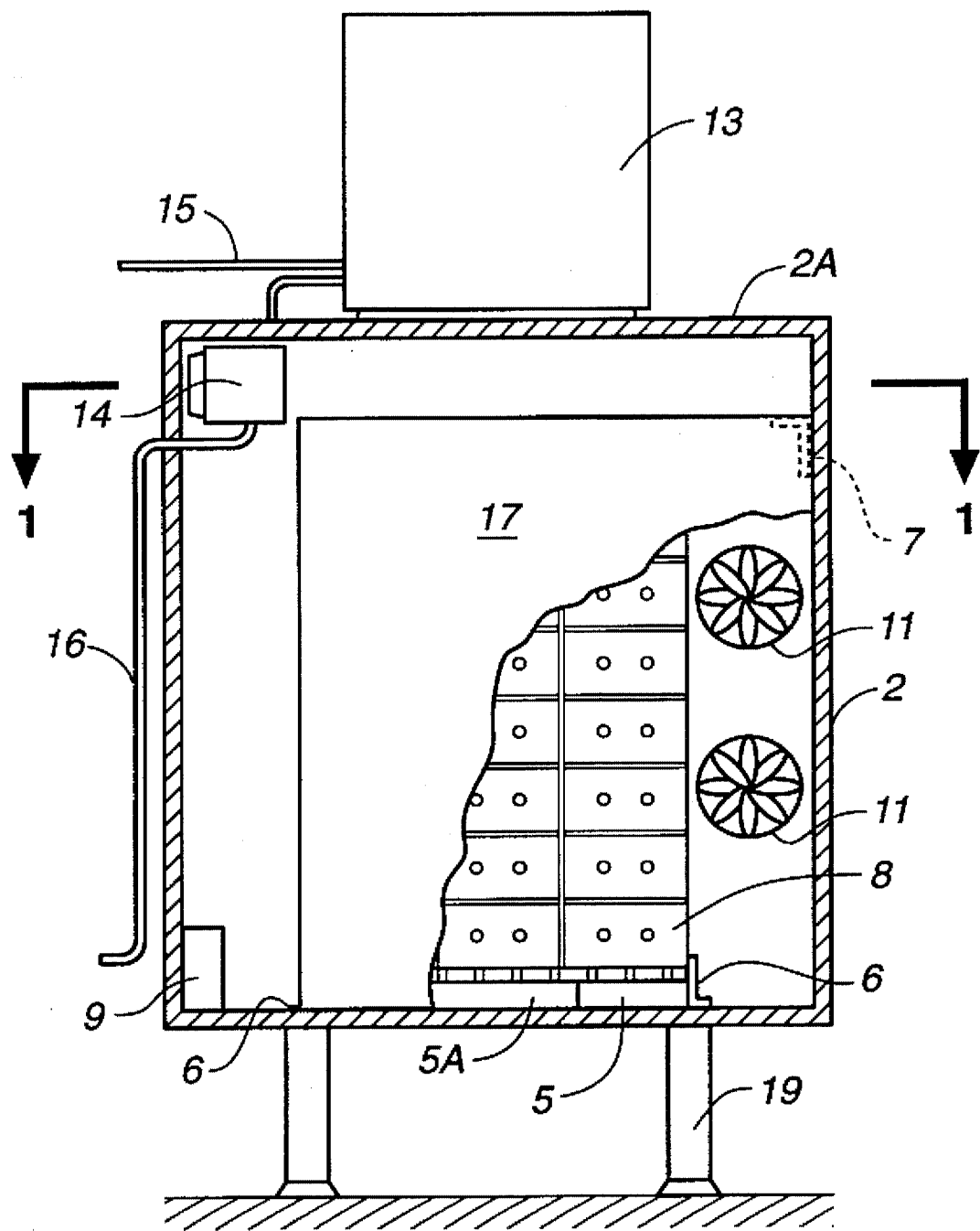
FIG._3

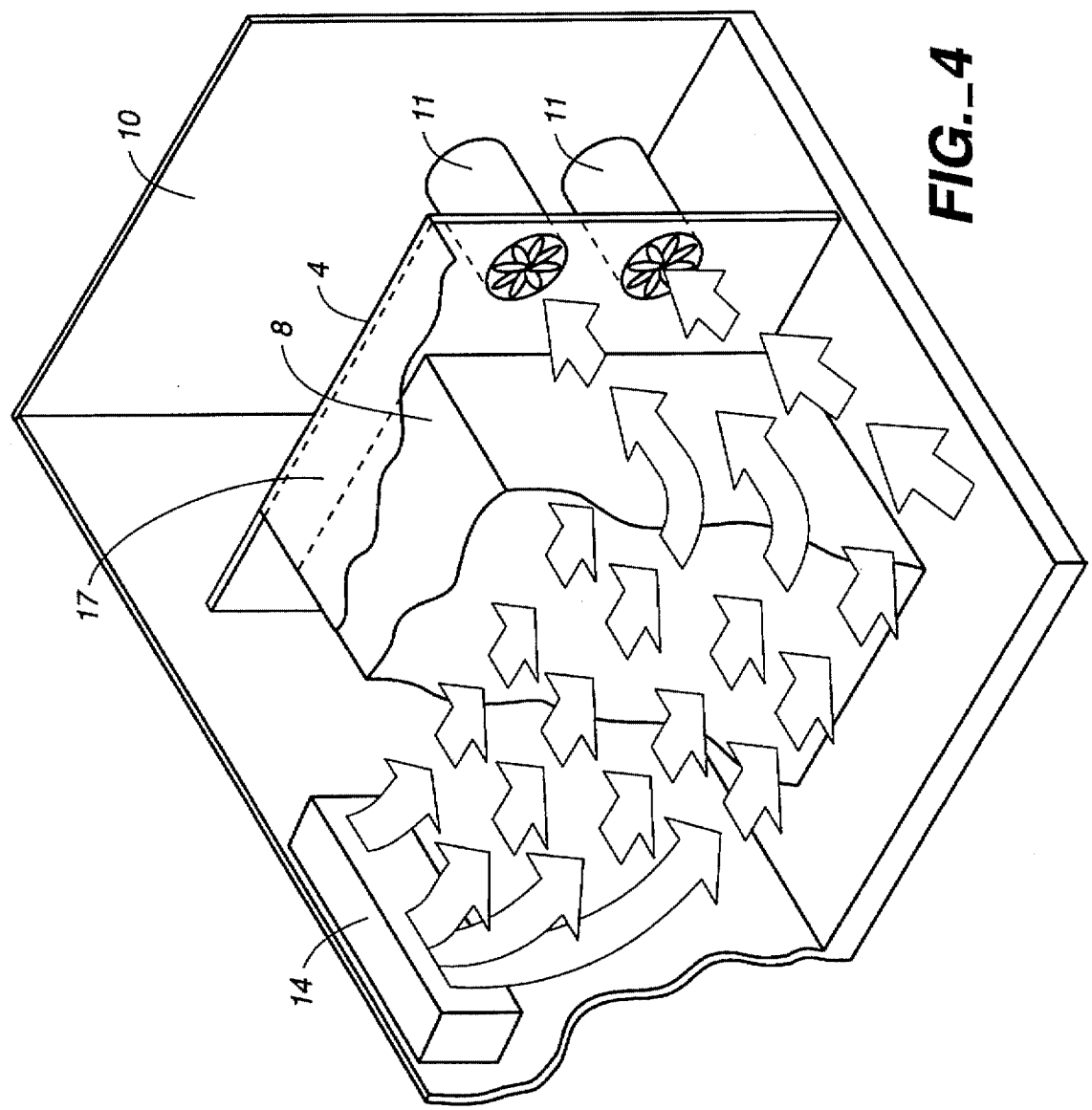
FIG._4

REFRIGERATION STORAGE TRAILER

FIELD OF THE INVENTION

This invention relates to the cold-storage and controlled ripening of fruit, such as bananas and the like; more particularly to a portable trailer of standard shape and size that is modified to accomplish such storage and ripening.

BACKGROUND OF THE INVENTION

It is known that the storage of bananas and similar fresh produce requires a carefully controlled environment, particularly with respect to temperature. It is necessary that all of the stored fruit remain at the same temperature so that all fruit ripens evenly and at the same time. Merely placing pallets of fruit in a cool room will not achieve this because fruit in the center of the pallet will be warmer than fruit near the cold air at the edge. Therefore, without proper cooling air circulation, the interior fruit will ripen first (perhaps even to the point of spoiling) while the "exterior" fruit remains green.

Fixed rooms are available wherein cooled pressurized air is drawn through pallets of boxed fruit. Insofar as the fruit boxes have breathing holes, nearly each piece of fruit is directly contacted by cooling air.

In this manner, fruit throughout an entire pallet, or assembly of pallets, can be kept at the same temperature and allowed to ripen together at a natural pace (hereinafter "ripening"). Should it be desired to hasten ripening (hereinafter "initiated ripening"), the temperature of all fruit can be raised artificially at the same time. Ethylene can be selectively added to the circulating air to further facilitate initiated ripening at the chosen time.

A problem with the exiting art with respect to refrigerated rooms built into buildings is that such rooms are expensive, and permanently take up considerable space in a warehouse or the like. There is a need for temporary fruit storage space, which can be increased and decreased in size, depending on the season and other requirements of the user. A need exists for such space which can be temporarily placed outside a warehouse, such as in a parking lot and which can be transported to alternate locations as desired. Furthermore, such a need exists for equipment which can initiate ripening, as well as allow natural ripening.

Prior developments in this field may be generally illustrated by reference to the following information disclosure statement:

U.S. PATENT DOCUMENTS

| U.S. Pat. No. | Patentee | Issue Date |
| --- | --- | --- |
| 5,028,443 | W. Wade | Jul. 2, 1991 |
| 5,460,841 | R. Herdeman | Oct. 24, 1995 |
| 3,620,765 | G. McDonnell | Nov. 16, 1971 |
| 4,598,555 | R. Windecker | Jul. 8, 1986 |
| 2,524,664 | J. Henderson et al. | Oct. 3, 1950 |
| 4,934,255 | G. McDonnell | Jun. 19, 1990 |
| 4,532,774 | D. Burns | Aug. 6, 1985 |
| 4,474,020 | C. Freeman | Oct. 2, 1984 |

U.S. Pat. Nos. 5,028,443, 5,460,841 and 3,620,765 teach portable units used to ripen fruit using ethylene and/or controlled temperature.

U.S. Pat. No. 5,028,443 teaches a self-contained modular unit for a single stack of fruit boxes loaded on a pallet. U.S. Pat. No. 5,460,841 shows a modified shipping container in which various gas concentrations are used to effect controlled ripening. Air circulation means within the container are not taught therein. In fact, the inventor states that the means of providing the controlled atmosphere is not critical to the invention.

U.S. Pat. No. 3,620,765 teaches a method of providing for the processes of initiated ripening, ripening, cooling and stabilized temperature. The treatment process takes place in a container placed within a building. The method of air handling requires two additional chambers when compared with the teachings of the present invention. This consumes space unnecessarily. There is no provision for floor mounted rollers for loading and unloading.

U.S. Pat. No. 4,598,555 teaches a portable gas cooler designed to provide cooled gas to containers of fresh harvested vegetation at a remote site. This patent does not teach methods for initiated ripening and ripening.

U.S. Pat. No. 2,524,664 teaches a trailer with a built-in roller system in the floor of the trailer to aid in moving freight.

U.S. Pat. No. 4,532,774 teaches a method for pre-cooling and heat removal in a portable enclosure at the site of harvesting. This patent does not teach methods or apparatus for initiated ripening and ripening. The entire apparatus includes a wheeled dolly 25 so that it may be towed from place to place.

U.S. Pat. No. 4,474,020 is another container modified with a suction fan and cooler in the back. The apparatus provides pressurized air cooling of unitized vegetable loads. It does not teach methods for initiated ripening and ripening of produce.

U.S. Pat. No. 4,934,255 teaches a method and apparatus for treating fruits that includes the use of an air plenum above palletized boxes of fruit to force air through the plenum and to the front of the trailer containing the palletized fruit. The means by which air is circulated in this invention is not comparable to that of the present invention.

The rest of the patents are representative of what was found in the art.

SUMMARY OF THE INVENTION

A method is taught herein of providing a controlled environment for the storage of bananas within a portable, standard insulated trailer cabin, wherein the following objectives are accomplished: initiated ripening; ripening; cooling and heat removal; temperature stabilization; and the loading and unloading of palletized fruit on skid-mounted rollers. The invention accomplishes within a portable cabin that which heretofore has only been accomplished in refrigeration rooms built within a fixed building. The apparatus and its method of use are designed to provide a flexible, climate-controlled storage space for produce (chiefly bananas) as an alternative to the costly and often restrictive construction or expansion of permanent building storage facilities.

Furthermore, with regard to efficient and even cooling and to treated air circulation, this invention teaches additional apparatus and methods nowhere suggested in the art. It is essential to this invention that ceiling-mounted air cooling units are uniformly distributed throughout the trailer along the long edge of the palletized fruit, thus allowing the cooled and/or treated air to be drawn across the fruit pallets directly and evenly and through as short a path as practical. This arrangement differs from that found in prior portable units where cooled air is essentially blown in at one end of the container and then forced along and across the storage volume.

The present invention utilizes a standard trailer cabin having four insulated walls and an insulated roof and floor. For convenience, having directional reference to FIG. 1 of the drawing, the right or rear (door) wall will be called the first wall, the left or front wall the second, the upper (passenger side) wall the third and the lower (driver's side) wall the fourth.

An air suction chamber is built into the forward part of the trailer near the second (front) wall. Suction fans are built into a thin sheet-metal fifth wall forming this chamber. A longitudinal row of air coolers are added to the cabin ceiling along the fourth (driver's side) wall. In use, a plastic membrane roll is drawn over the top and one end of the pallet row. The membrane is supported on the suction side of the row against the third (passenger side) trailer wall by rest rails. The system is designed to convert existing or new standard trailers into 100% pressurized storage cabins within which thermostaticly-controlled air mixed with ethylene vapor is uniformly circulated through each box of produce in each pallet of boxes.

An important feature of the invention is the addition of a continuous track of floor-mounted traction steel pipe rollers upon which pallets of fruit may be loaded with a fork lift and then moved forward in the trailer without using a fork lift. This is important for two reasons. First, a fork lift cannot enter the low-roofed trailer cabin. Second, the trailer is elevated off the ground by its wheels and undercarriage. Therefore, the use of floor rollers allows a fork lift to approach the trailer and deliver a pallet of fruit without the need for a loading dock. Once the load is in the trailer, it may be moved about therein nearly effortlessly.

The storage capacity of a standard 42 foot trailer so modified is 10 pallets and the storage capacity of a standard 45 foot trailer is 11 pallets. Insofar as the width of a standard trailer is about 8 feet, such trailers are at least five times as long as they are wide.

FEATURES AND ADVANTAGES

An object of this invention is to provide a refrigeration storage trailer apparatus for holding pallets of produce that includes an insulated rectilinear cabin having first, second, third and fourth outer walls, a floor, a ceiling and a longitudinal axis extending from the first to the second walls parallel to the third and fourth walls—the third and fourth walls being substantially longer than the first and second. The apparatus further includes a plurality of coolers mounted adjacent to the ceiling and the fourth wall, forming a cooler row which is parallel to the longitudinal axis. There is a condensing unit mounted external to the cabin and operatively connected to the coolers. A fifth partition wall is mounted parallel to the second wall and is spatially separated therefrom, thereby forming an air suction chamber. At least one fan, preferably two, in the fifth wall creates a pressure differential between opposite sides of the fifth wall. Means are provided for creating an air pathway extending from the coolers, thence transversely across the longitudinal axis, thence along the third wall, thence through the fan, thence through the air chamber, and thence back to the coolers.

A further feature is that the air pathway means includes a membrane extending from the third wall along a first horizontal line thereon above the fan, across the longitudinal axis, to a second imaginary line spatially separated from the fourth wall below the coolers. Preferably, the imaginary line is formed by an upper edge of the pallet row—thereby providing support to the free edge of the membrane.

Other features are a membrane-support rail mounted on the third wall and a large plurality of rollers mounted axially transverse the longitudinal axis along a roller row.

Yet other features are that the third and fourth walls are at least five times the length of the first and second walls and that the roller row is divided into two segments. A first row segment of rollers starts adjacent to the first wall (i.e. the door end of the trailer. A second row segment of rollers are wider than the rollers of the first row segment.

Yet another feature is wheels mounted under the floor, in the manner of standard truck transportation trailers.

Another feature is an apparatus that is easy to use and suitable for mass production at relatively low cost.

Other novel features which are characteristic of the invention, as to organization and method of operation, together with further objects and advantages thereof will be better understood from the following description considered in connection with the accompanying drawing, in which a preferred embodiment of the invention is illustrated by way of example. It is to be expressly understood, however, that the drawing is for illustration and description only and is not intended as a definition of the limits of the invention.

Certain terminology and derivations thereof may be used in the following description for convenience in reference only, and will not be limiting. For example, words such as "upwardly," "downwardly," "leftward," and "rightward" would refer to directions in the drawings to which reference is made unless otherwise stated. Similarly, words such as "inwardly" and "outwardly" would refer to directions toward and away from, respectively, the geometric center of a device or area and designated parts thereof. References in the singular tense include the plural, and vice versa, unless otherwise noted.

BRIEF DESCRIPTION OF THE DRAWING

FIG. 1 is a schematic sectional and broken-sectional top plan view of a preferred embodiment of the invention, taken generally along line 1—1 of FIG. 2;

FIG. 2 is a schematic sectional and broken-sectional frontal elevation of the embodiment of FIG. 1, taken generally along line 2—2 of FIG. 1;

FIG. 3 is a schematic sectional and broken-sectional side elevation of the embodiment of FIG. 1, taken generally along line 3—3 of FIG. 1; and FIG. 4 is a broken schematic perspective view of the embodiment of FIG. 1, illustrating the transverse air flow path through the row of fruit pallets.

| Drawing Reference Numerals | |
|---|---|
| 1 | refrigeration storage trailer apparatus |
| 2 | cabin wall |
| 2A | cabin roof |
| 3 | cabin floor |
| 4 | wall |
| 5 | rollers |
| 5A | rollers |
| 6 | angle guides |
| 7 | rail |
| 8 | pallets |
| 8A | holes |
| 9 | ethylene container |
| 10 | air suction chamber |
| 11 | suction fans |
| 12 | thermostat controls and switch |
| 13 | condensing unit |

-continued

| | Drawing Reference Numerals |
|---|---|
| 14 | coolers |
| 15 | main power supply |
| 16 | condensation pipe |
| 17 | membrane |
| 18 | wheels |
| 19 | undercarriage |

DESCRIPTION OF A PREFERRED EMBODIMENT

Referring to FIGS. 1–3, them is illustrated therein a refrigeration storage trailer apparatus 1. The refrigeration storage trailer apparatus 1 comprises a cabin bounded by four standard, insulated cabin walls 2, a standard, insulated cabin roof 2A, and a standard, checkered plate, cabin finished floor 3. While the invention might be constructed within a shipping container (to which an undercarriage and wheels are added during transportation), preferably the refrigeration storage trailer apparatus 1 will rest on a rear set (right side of FIG. 2) of wheels 18 and, at the front (left side of FIG. 2), a stand or undercarriage 19.

Added to the back of the cabin is a fifth 16-gauge galvanized sheet metal divider wall 4 (the thickness of which is greatly exaggerated in the drawing for clarity of illustration). Centered along the longitudinal axis of the apparatus 1 is an elongated, relatively wide, row of traction steel pipe rollers 5. At the rear end of the trailer cabin, next to the first wall (or the trailer doors—not illustrated), a narrow row of rollers 5A extends rightward (rearward) beyond the wide row of rollers 5. The narrowing of the rollers at the rear door end of the apparatus allows the rollers 5A to accommodate a fork lift (not illustrated) and to provide workers with room to maneuver around the fork lift off-loading area. Once on rollers 5A, fruit pallets 8 can be moved by hand to the wider segment of rollers 5 (about as wide as a pallet) for arrangement in an extended row along the longitudinal axis of the apparatus. Floor welded steel angle guides 6 assist in the positioning of fruit pallets.

A wall-mounted welded steel rail 7 extends along the third (passenger-side) wall at the height above the cabin floor 3 which the pallets 8 reach when on the rollers 5. An ethylene container 9 is floor-mounted at a suitable location within the trailer cabin.

The addition of the divider wall 4 forms a air suction chamber 10 at the left (front or second wall) end of the refrigeration storage trailer apparatus 1. Cooled and/or ethylene-treated air is sucked into the air suction chamber 10 by a pair of 18.5 inch I.D. suction fans 11. Suitable thermostat controls and switch 12, such as are available from Chiquita Brands, Inc., are provided at a convenient location near the first wall (rear door) end of the apparatus 1. A condensing unit 13 is mounted on the outside of the cabin roof 2A. A preferred model of unit 13 is the horizontal air discharge, outdoor discus condensing unit Model No. HDH0500D7 or HSH0501D7 of Chandler Refrigeration, a line of Heatcraft, Inc. The main power supply 15 leads into the condensing unit 13.

An elongated row of regularly-spaced, 4-fan, low-silhouette unit coolers 14 (available from Chandler Refrigeration) preferably three in number, are mounted immediately adjacent and below the cabin roof 2A on the fourth (driver's side) of the walls 2. These are aligned in a row which is parallel to the longitudinal axis of the apparatus (perpendicular to the axes of the rollers 5) so as to direct air transversely through the long side of the row of pallets 8 rather than through the short end thereof, as discussed below. Suitable condensation pipe 16 is provided with which to drain the coolers 14.

When the desired complement of pallets 8 are rolled into line, a 6 Mill. viscuine membrane 17 is placed on top of them and on top of the rail 7.

OPERATION

As is common in the art, fruit to be stored and, eventually, to be allowed to ripen or to have ripening initiated, is contained in cardboard boxes. Such boxes have holes 8A placed at regular intervals so that air may be circulated therethrough. Fixed numbers of boxes of fruit come stacked in pallets 8 at standard heights, widths and depths.

The pallets 8 are loaded into the first wall (door) end with a fork lift (not illustrated). The fork lift first raises the loaded pallet in its two tines above the level of the wheels 18, to the height of the cabin floor 3. The operator moves forward, drops the pallet onto the rollers 5A, and withdraws.

Once in the cabin of the apparatus 1, the first pallet 8 is moved by hand longitudinally forward, onto rollers 5, and up adjacent to the divider wall 4. Each succeeding pallet is moved adjacent to the preceding one, until the pallets form, in combination, a row centered about the longitudinal axis, i.e., the axis perpendicular to the planes of the first and second (rear and front) walls.

After a desired quantity of fruit or other produce is loaded, the thin membrane 17 is rolled over the top of the pallets 8 and over the top of the rail 7 affixed on the third (passenger side) cabin wall 2 opposite the longitudinal row of coolers 14. If necessary to support the membrane between the pallets 8 and the rail 7, battens or the like (not illustrated) may be employed.

To remove residual heat, thereby slowing or halting natural ripening, the thermostat 12 is set to a predetermined temperature. The suction fans 11, condensing unit 13 and coolers 14 are activated. The fans, located adjacent to the third (passenger side) wall, create a pressure drop between the air suction chamber 10 and the enclosed space formed below the membrane 17 between the pallets 8 and the third cabin wall 2.

Turning to the schematic illustration of FIG. 4, it can be seen that cool air leaving the coolers 14 flows downward and, due to the pressure drop created by the suction fans 11 under the membrane 17, is quickly and directly drawn through the holes 8A into the interior of the boxes stacked on the pallets 8 in a direction which is transverse or perpendicular to the longitudinal axis of the refrigeration storage trailer apparatus 1. This causes the cool air to pass by virtually every individual banana or other item of produce. Upon leaving the opposite side of the pallets 8, the air is drawn by the suction fans 11 into the air suction chamber 10. The wall 4 forming the air suction chamber 10 is shorter than the cabin walls 2, thereby leaving a path for the air to return along the cabin roof 2A to the suction fans 11—whereupon it is constantly re-circulated. The air in the trailer cabin reaches a constant temperature fairly soon, and, more importantly, the air surrounding the produce begins to be held at the pre-selected temperature. This keeps all the produce at the same temperature, ensuring even ripening (or the temporary lack thereof) throughout the stored stock.

Insofar as the natural ripening process generates its own heat (even when refrigerated produce is stored) this process must be continuously maintained and regulated by the thermostat 12 until ripening is desired. When desired, the temperature is allowed to rise by a known amount through suitable thermostatic adjustment. Ripening then will occur.

If it is desired to hasten ripening, ripening may be initiated by releasing ethylene gas from the ethylene container 9, in concentrations and amounts already established in the art. Once ripened to the appropriate extent, the produce may be removed from the refrigeration storage trailer apparatus 1 by hand and fork lift, in the manner described above.

Were the air to be forced longitudinally (front to rear) through the long row of pallets 8 (up to 12 pallets in length in some standard trailers) a temperature differential might be set up between the point of entry of the air (relatively cooler) and its point of exit (relatively warmer). This could cause uneven ripening—the warmer fruit naturally ripening sooner. Furthermore, it could become necessary to vary the parameters of the process according to the length of the row of pallets, particularly if less than a full row were to be stored in the apparatus.

With the axially-transverse(side-to-side) air flow set up by the configuration of the present invention, the shortest and most efficient path through the pallet row is used. Furthermore, the length of this path (one pallet width) remains constant no matter how long the row of pallets 8.

As noted above, the length of a standard trailer is five or more times its width. A row of pallets substantially filling the trailer can exceed this length to width ratio. Therefore, directing the air sideways through the pallet row, as taught in this invention, achieves a very significant reduction in the length of the path across the stored fruit.

Furthermore, placing the coolers in a row along one side of the elongated pallet row shortens the distance from the point of exit of air from a cooler to its point of entry into a pallet. This lessens the degree to which the cool air can be mixed with warm air being drawn through the cabin to the coolers, or otherwise be warmed prior to contacting the produce.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, various modifications, alternative constructions, and equivalents may be employed without departing from the true spirit and scope of the invention. Such changes might involve alternative materials, components, structural arrangements, sizes, operational features or the like. Therefore, the above description and illustrations should not be construed as limiting the scope of the invention, which is defined by the appended claims.

What is claimed is:

1. A refrigeration storage trailer apparatus for holding pallet's of produce including:
   an insulated rectilinear cabin having
      first, second, third and fourth outer walls,
      a floor,
      a ceiling and
      a longitudinal axis extending from the first to the second walls parallel to the third and fourth walls, the third and fourth walls being substantially longer than the first and second;
   a plurality of coolers mounted adjacent to the ceiling and along a cooler row which is parallel to the longitudinal axis and to the fourth wall;
   a condensing unit mounted external to the cabin and operatively connected to the coolers;
   a fifth partition wall mounted parallel to the second wall and spatially separated therefrom, thereby forming an air suction chamber;
   at least one fan in the fifth wall for creating a pressure differential between opposite sides of the fifth wall; and
   means for creating an air pathway extending from the coolers, transversely across the longitudinal axis, along the third wall, through the fan, through the air chamber and back to the coolers.

2. The apparatus of claim 1 wherein:
   the air pathway creating means includes a membrane extending from the third wall along a first line thereon above the fan, across the longitudinal axis, to a second line spatially separated from the fourth wall running parallel to and below the cooler row.

3. The apparatus of claim 2 further including:
   a membrane-support rail mounted horizontally on the third wall.

4. The apparatus of claim 2 further including:
   a large plurality of rollers mounted axially transverse to the longitudinal axis along a roller row.

5. The apparatus of claim 4 wherein:
   the third and fourth walls are at least five times the length of the first and second walls and
   the roller row is divided into two segments,
      a first row segment of rollers starting adjacent to the first wall and
      a second row segment of rollers which are wider than the rollers of the first row segment.

6. The apparatus of claim 5 further including:
   wheels mounted under the floor.

7. A refrigeration storage trailer apparatus for holding pallets of fruit, including:
   an insulated cabin having
      first, second, third and fourth outer walls,
      a floor,
      a ceiling and
      a longitudinal axis extending from the first to the second walls;
   at least three coolers mounted adjacent to the ceiling and the fourth wall, and along a cooler row which is parallel to the longitudinal axis;
   a condensing unit mounted external to the cabin on top of the ceiling and operatively connected to the coolers;
   a fifth partition wall mounted parallel to the second wall and spatially separated therefrom, thereby forming an air suction chamber, the fifth wall being shorter than the other four walls;
   at least one fan in the fifth wall for creating a pressure differential between opposite sides of the fifth wall;
   a horizontal membrane-support rail mounted on the third wall above the fan; and
   a membrane extending from the third wall along the membrane-support rail, across the longitudinal axis, to a horizontal line spatially separated from the fourth wall below the coolers, the membrane being at least partially supported by pallets when pallets are held in the apparatus, and also being supported by the membrane-support rail.

8. The apparatus of claim 7 further including:
   a large plurality of rollers mounted axially transverse to the longitudinal axis along a roller row.

9. The apparatus of claim 8 wherein:
   the third and fourth walls are at least five times the length of the first and second walls and the roller row is divided into two segments,
a first row segment of rollers starting adjacent to the first wall, the first row segment being about as wide as a pallet and
a second row segment of rollers which are narrower than the rollers of the first row segment.

10. The apparatus of claim 9 further including:
wheels mounted under the floor.

11. A refrigeration storage trailer apparatus for holding pallets of produce including:
an insulated cabin having
first, second, third and fourth outer walls,
a floor,
a ceiling and
a longitudinal axis extending from the first to the second walls parallel to the third and fourth walls, the length of the third and fourth walls being at least five times the length of the first and second walls;
a plurality of coolers mounted adjacent to the ceiling and the fourth wall, the coolers forming a horizontal cooler row which is parallel to the longitudinal axis;
a condensing unit mounted external to the cabin on the ceiling and operatively connected to the coolers;
a fifth partition wall mounted parallel to the second wall and spatially separated therefrom, thereby forming an air suction chamber;
two fans in the fifth wall for creating a pressure differential between opposite sides of the fifth wall;
a membrane extending from the third and fifth walls along a membrane-support rail horizontally mounted on the third wall above the fans, thence across the longitudinal axis, thence to a horizontal line spatially separated from the fourth wall below the coolers, the membrane creating an air pathway extending from the coolers, transversely across the longitudinal axis, parallel to the third wall, through the fans, through the air chamber, and back to the coolers;
wheels mounted under the floor; and
a large plurality of rollers mounted axially transverse the longitudinal axis, the rollers forming a roller row.

12. The apparatus of claim 11 wherein:
the roller row is divided into two segments,
a first row segment of rollers starting adjacent to the first wall and
a second row segment of rollers which are wider than the rollers of the first row segment.

* * * * *